United States Patent [19]
Uchida

[11] Patent Number: 5,477,823
[45] Date of Patent: Dec. 26, 1995

[54] CONTROL VALVE FOR ENGINE INTAKE CONTROL SYSTEM

[75] Inventor: Masahiro Uchida, Iwata, Japan

[73] Assignee: Yamaha Hatsudoki Kabushiki Kaisha, Iwata, Japan

[21] Appl. No.: 378,532

[22] Filed: Jan. 24, 1995

[30] Foreign Application Priority Data

Jan. 25, 1994 [JP] Japan .................................. 6-006671
Jan. 25, 1994 [JP] Japan .................................. 6-006672

[51] Int. Cl.⁶ .......................... F02B 31/00; F02B 15/00
[52] U.S. Cl. .......................... 123/308; 123/432; 123/590
[58] Field of Search .................................. 123/590, 308, 123/432

[56] References Cited

U.S. PATENT DOCUMENTS 5,203,299 4/1993 Ueda ....................................... 123/308
5,311,848 5/1994 Isaka et al. ............................. 123/308

FOREIGN PATENT DOCUMENTS 3202619 9/1991 Japan ..................................... 123/432
4262021 9/1992 Japan ..................................... 123/308

Primary Examiner—Henry C. Yuen
Assistant Examiner—Erick Solis
Attorney, Agent, or Firm—Knobbe, Martens, Olson & Bear

[57] ABSTRACT

An induction system and control arrangement for a three valve per cylinder engine, wherein the induction passages are tuned to provide different effective lengths for different engine running conditions. In addition, a control valve arrangement is provided for controlling the flow to the combustion chambers through the valve seats to generate unrestricted flow under high-speed, high-load conditions and tumble and/or tumble and swirl for promoting turbulence under low-speed, low-load conditions.

30 Claims, 17 Drawing Sheets

5,477,823

CONTROL VALVE FOR ENGINE INTAKE CONTROL SYSTEM

BACKGROUND OF THE INVENTION

This invention relates to an induction system for an internal combustion engine and more particularly to an improved control valve arrangement for an engine intake control system.

It has been known that the performance of an engine and particularly its power output can be substantially increased by employing multiple intake valves. Therefore, it is a common practice with many engines, particularly of the automotive type, to employ two intake valves per cylinder. However, the advantages of employing even more, and specifically three intake valves for each cylinder, are becoming recognized.

Although the use of multiple intake valves can be effective in increasing the power output of an engine, the use of such free-breathing induction systems can deteriorate the performance at low speeds and mid-range. The reason for this is that the intake charge flows relatively slowly into the combustion chambers under these conditions with the free-breathing intake passages. As a result, there is low turbulence in the combustion chamber and flame propagation under these low speed, low load conditions deteriorates.

In order to further improve the performance of three valve per cylinder engines, particularly under low speed running, it has been proposed to employ various tuning devices for the induction system. Although these tuning devices can improve volumetric efficiency, they still may not totally solve the problems under all conditions.

It is, therefore, a principal object of this invention to provide an improved control valve arrangement for a multi-valve engine wherein the control valve can be employed to generate turbulence in the combustion chamber without restricting the output at high-load and high-speed conditions.

It is a further object of this invention to provide an improved control valve assembly for a multi-valve engine wherein the desired types of turbulence can be generated in the combustion chamber under varying running conditions.

It has also been acknowledged that turbulence in the combustion chamber is effective under some running conditions so as to improve engine performance. Turbulence helps to increase the rate of flame propagation and ensures complete burning. However, the type of turbulence which is generated can be significant in controlling and improving engine performance. One type of turbulence, called "swirl," is by a rotary motion around the cylinder bore axis. This type of turbulence is relatively easy to generate, particularly with three-valve-per-cylinder engines. However, a different type of turbulence known as tumble has been found to give better performance under some running conditions. Tumble is a type of swirling motion, but the motion occurs about an axis that extends generally transversely to the cylinder bore axis. This type of motion is more difficult to generate, particularly with three-valve-per-cylinder engines.

It is, therefore, a still further object of this invention to provide an improved three-intake-valve-per-cylinder engine having a control valve that is usable to generate tumble in the combustion chamber under some running conditions.

SUMMARY OF THE INVENTION

This invention is adapted to be embodied in an induction system for an internal combustion engine having a combustion chamber served by at least three valve seats. An intake passage arrangement comprised of at least a common section serves each of the valve seats. A control valve is supported in the common section for controlling the flow therethrough and is movable between a first position wherein the flow through each of the valve seats is substantially unrestricted and without significantly affecting the flow direction issuing from the valve seats into the combustion chamber. In a second position, the control valve substantially restricts the flow through one of the valve seats, and the flow through another one of the valve seats is directed into the combustion chamber in a different direction than when the control valve is in its first position.

DETAILED DESCRIPTION OF THE PREFERRED EMBODIMENTS OF THE INVENTION

Figure 1:
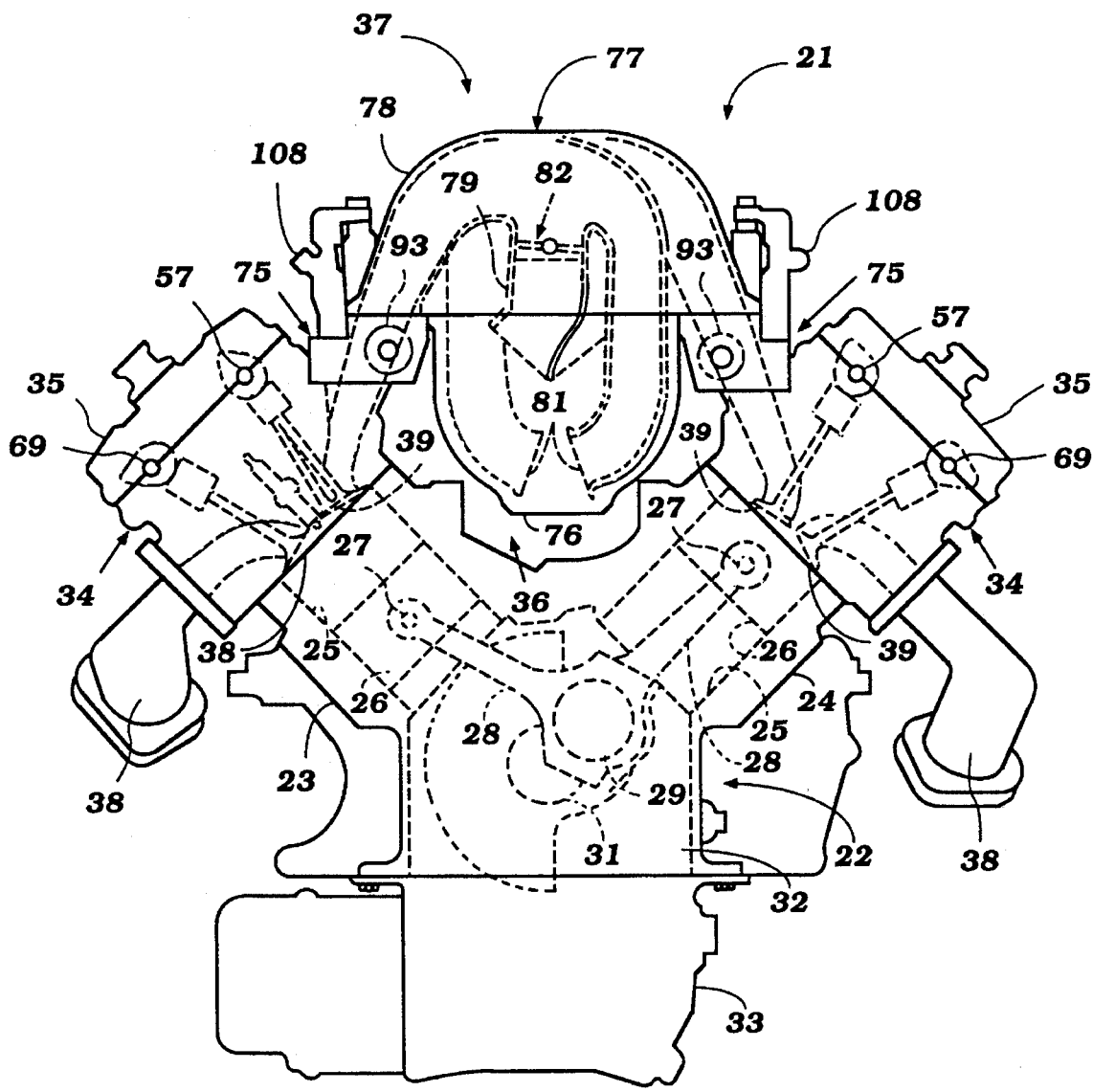
FIG. 1 is a front elevational view of an internal combustion engine constructed in accordance with a first embodiment of the invention.

Referring now in detail to the drawings and initially to FIG. 1, an internal combustion engine constructed in accordance with an embodiment of the invention is indicated generally by the reference numeral 21. As will become apparent, the engine 21 is of the V-8 type and operates on a four-stroke principle. Although the invention is described in conjunction with such an engine, it will be readily apparent to those skilled in the art that certain facets of the invention may be employed with engines having other cylinder numbers and other cylinder configurations. It is believed well within the scope of those skilled in the art to understand how the features of the invention may be employed with such other engines.

The engine 21 is comprised of a cylinder block, indicated generally by the reference numeral 22, having two angularly inclined cylinder banks 23 and 24, each of which is formed with four respective cylinder bores 25. In the illustrated embodiment, the angle between the cylinder banks 23 and 24 is 90°.

Pistons 26 are slidably supported within each of the cylinder bores 25. These pistons 26 are connected by means of piston pins 27 to the upper or small ends of respective connecting rods 28. As is typical with V-type engine practice, the cylinder bank 23 is staggered slightly in an axial direction relative to the cylinder bank 24 so that the connecting rods 28 of respective cylinders of the banks 23 and 24 can be journaled on common throws 29 of a crankshaft 31. The crankshaft 31 is rotatably journaled in a well-known manner within a crankcase chamber formed by a skirt 32 of the cylinder block 22 and a crankcase member 33 that is detachably affixed thereto in a known manner.

The construction of the cylinder block 22 and those components which are contained within it and the crankcase member 33 may be considered to be conventional. Since the invention deals primarily with the induction system, to be described later, further details of the construction of the lower portion of the engine is not believed to be necessary to permit those skilled in the art to practice the invention. For that reason, further description of these conventional components will not be made.

Cylinder heads 34 are affixed to each of the cylinder banks 23 and 24 in a manner which will be described. Also, the detailed construction of the cylinder heads 34 and the mechanisms contained therein will be described by reference to FIG. 2 and related, copending applications. Cam covers 35 are affixed to the cylinder heads 34 in a suitable manner.

It should be noted that the cylinder banks 23 and 24 and the attached cylinder heads 34 and attached cam covers 35 define a valley between them, which valley is indicated generally by the reference numeral 36. An induction system, indicated generally by the reference numeral 37 and which also will be described later in more detail by reference to the remaining figures, since it embodies the invention, is disposed in this valley 36 for supplying a fuel-air charge to the individual combustion chambers of the engine 21.

Exhaust manifolds 38 are affixed to the outer sides of the cylinder heads 34 and discharge the exhaust gases to the atmosphere through any conventional type of exhaust system (not shown).

The configuration of the combustion chambers for the engine will now be described by primary reference to FIGS. 2–4. It should be initially noted that the cylinder heads 34 for each of the cylinder banks 23 and 24 are substantially identical in construction, with the cylinder head 34 for the bank 23 being placed onto the bank 23 in the one direction. When the same cylinder head 34 is attached to the cylinder bank 24, the head 34 will be reversed from this position. This permits the use of a single casting for both sides of the engine 21 with obvious cost advantages.

The cylinder head 34 has a lower sealing surface 38 that is affixed to the upper end of the respective cylinder block 23 or 24 by fasteners 40 so as to effect a tight gas seal therewith. The cylinder head surface 38 is provided with individual recesses 39 which cooperate with the cylinder bores 25 and the heads of the pistons 26 to form the combustion chambers for the engine 21. In a preferred form, the combustion chambers have a generally lens-shaped configuration, as described in the copending application of Masaaki Yoshikawa, entitled "Engine Combustion Chamber and Air Intake Device," Ser. No. 08/354,539, filed Dec. 13, 1994, and assigned to the assignee hereof. Where any details of the combustion chamber configuration are not described herein, reference may be had to that copending application, the disclosure of which is incorporated herein by reference, for such details.

Figure 2:
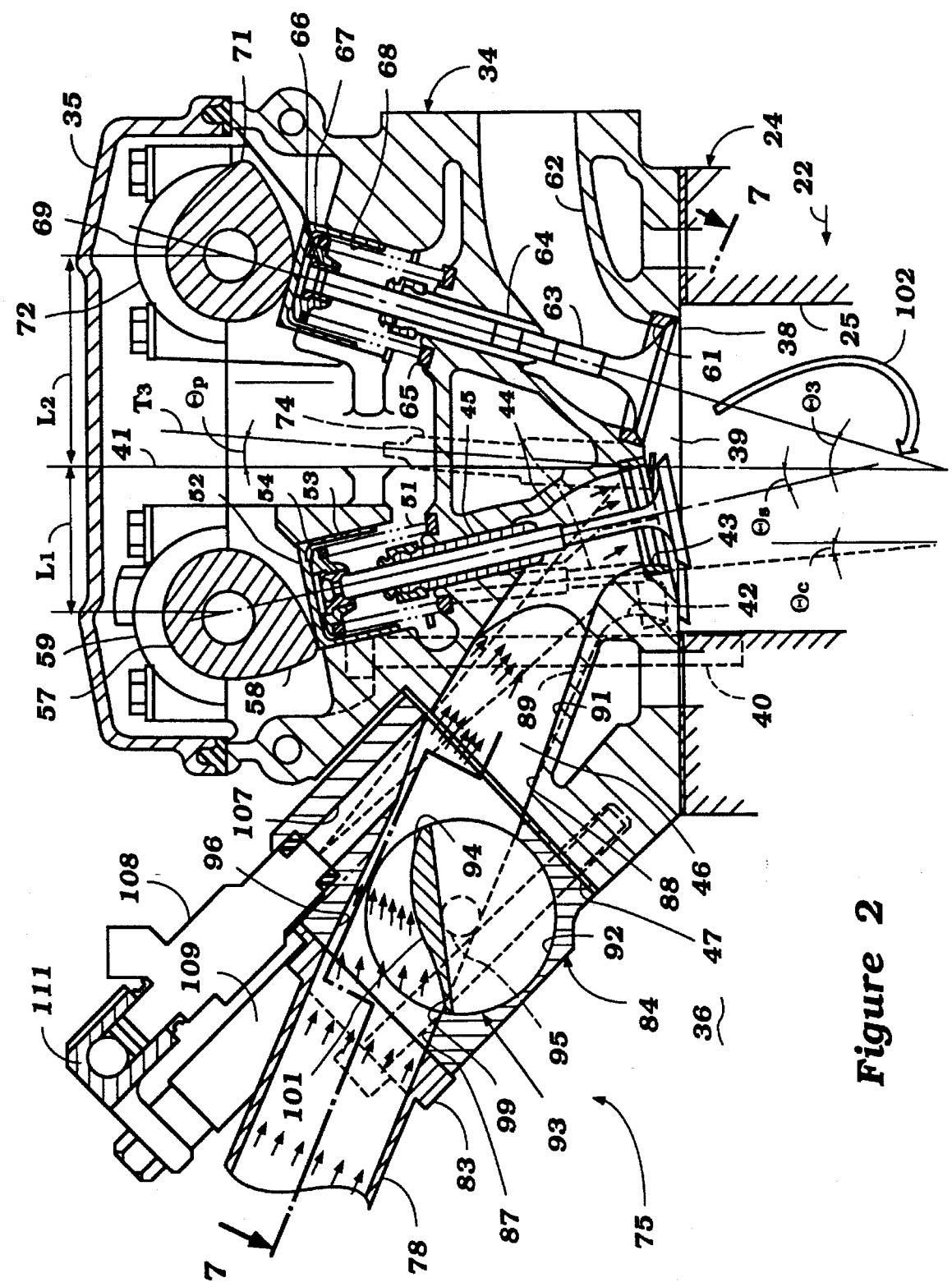
FIG. 2 is an enlarged cross-sectional view taken through one of the cylinder banks and shows the induction system and the flow control valve in a first position.

The axes of the individual cylinder bores 25 are indicated in FIG. 2 and identified by the reference numeral 41 for orientation purposes. On one side of a plane containing the cylinder bore axis 41 there is provided a center intake valve seat 42. This intake valve seat 42 is disposed generally on the outer periphery of the cylinder bore 25 and is spaced the greatest distance from the cylinder bore axis 41.

A further pair of side intake valve seats 43 are disposed closer to the cylinder bore axis 41, but are positioned so as to extend in part across the aforenoted plane containing the cylinder bore axis 41.

Respective poppet-type intake valves 44 are slidably supported in the cylinder head 34 by pressed or cast-in guides 45 and control the flow through the valve seats 42 and 43. The reciprocal axis of the intake valve 44 associated with the center valve seat 42 is disposed at an acute angle $\theta_c$ to a plane which is parallel to the cylinder bore axis 41 and to the aforenoted plane containing it. This plane is offset from the plane containing the cylinder bore axis 41 toward the valley 36 between the cylinder banks 23 and 24.

The intake valves 44 associated with the side intake valve seats 42 have their reciprocal axes lying in a common plane. This plane is also disposed at an acute angle to the plane containing the axis 41. This acute angle, indicated by the dimension $\theta_s$, is greater than the acute angle $\theta_c$. An intake passage arrangement, indicated generally by the reference numeral 46, extends from an outer surfaces 47 of the cylinder heads 34 on the side adjacent the valley 36 and is served by the intake system 37 in a manner which will be described. The intake passage arrangement 46 in this embodiment is of a Siamesed-type intake passage that serves all of the valve seats 42 and 43. However, other arrangements are possible. The invention, however, has particular use with Siamesed passages having a common portion, for a reason as will become apparent.

Referring again to FIG. 2, coil compression springs 51 encircle the stems of the intake valves 44 and bear against machined surfaces on the cylinder head 34 and keeper retainer assemblies 52 fixed to the upper ends of the stems of the valves 44 for urging the valves 44 to their closed positions. Thimble tappets 53 are slidably supported in tappet-receiving bores 54 formed in the cylinder head 34 for actuating the valves 44. The bores 54 are disposed at the same angle as the reciprocal axes of their respective valve stems 44.

An intake camshaft, indicated generally by the reference numeral 57, is rotatably supported in the cylinder head 34 in a manner which will be described. This intake camshaft 57 is driven in a manner which will also be described at one-half crankshaft speed. The intake camshaft 57 is provided with three cam lobes 58 for each cylinder which it serves and which are spaced apart by bearing surfaces. These bearing surfaces are, in turn, journaled in the cylinder head 54 in bearings formed integrally in the cylinder head.

The intake camshaft 57 is supported for rotation by bearing caps 59 that are affixed to the cylinder head 34 in the manner described in the copending application of Tateo Aoyoma and Masahiro Uchida, entitled "Cylinder Head Arrangement for Multi-Valve Engine," Ser. No. 08/363,412, filed Dec. 23, 1994 (attorney docket no. YAMAH2.847A) and assigned to the assignee hereof. In fact, that copending application discloses further details of the construction of the cylinder head 34, the way in which the tappet-receiving bores 54 are formed, and other details of the cylinder head arrangement. That disclosure is incorporated herein by reference. Since this invention deals primarily with the induction system for the engine, it is believed that the details of the construction of the cylinder heads except for what are given herein are not necessary for those skilled in the art to practice the invention.

Figure 3:
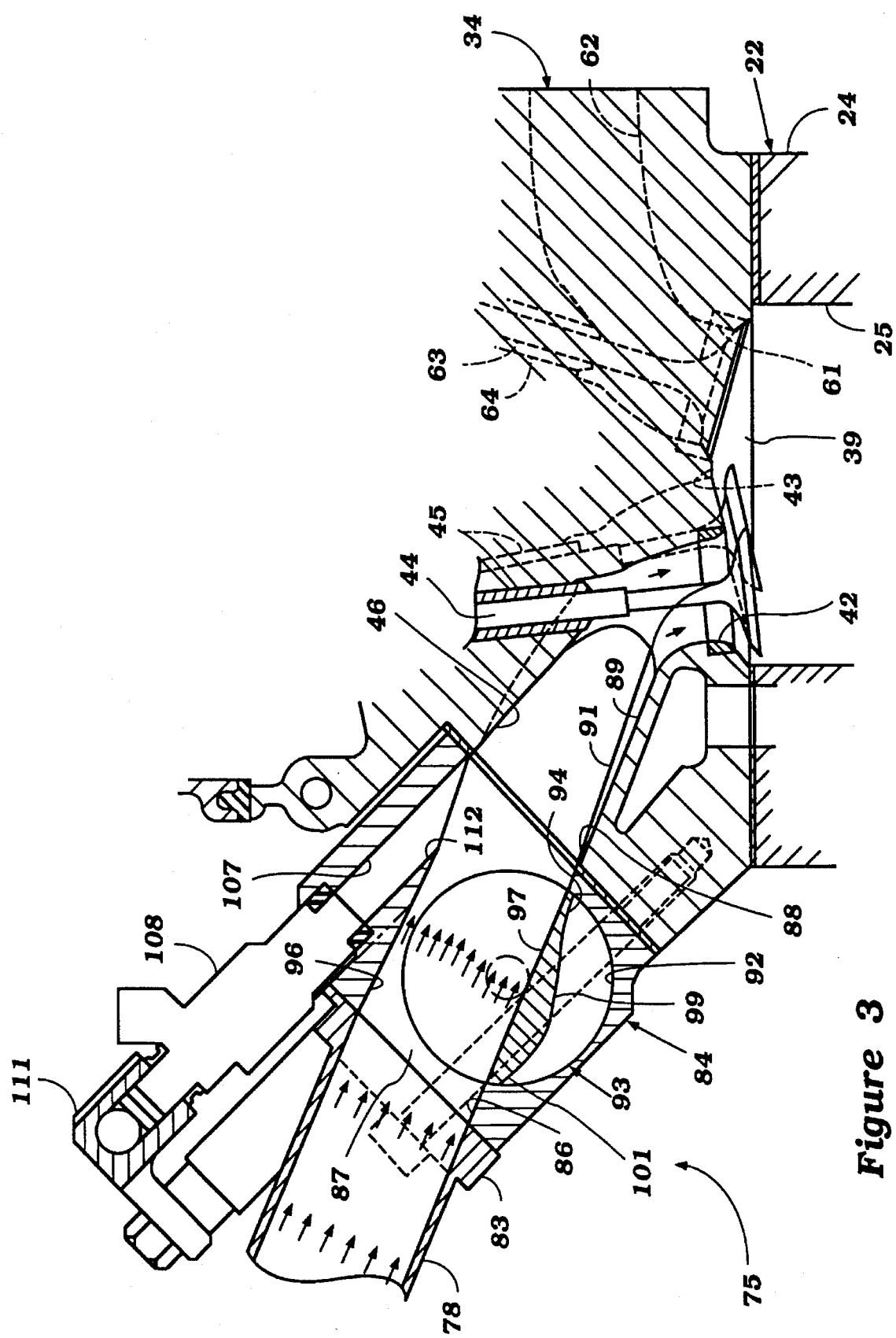
FIG. 3 is a further enlarged cross-sectional view, in part similar to FIG. 2, and shows the control valve in a second position.
Figure 4:
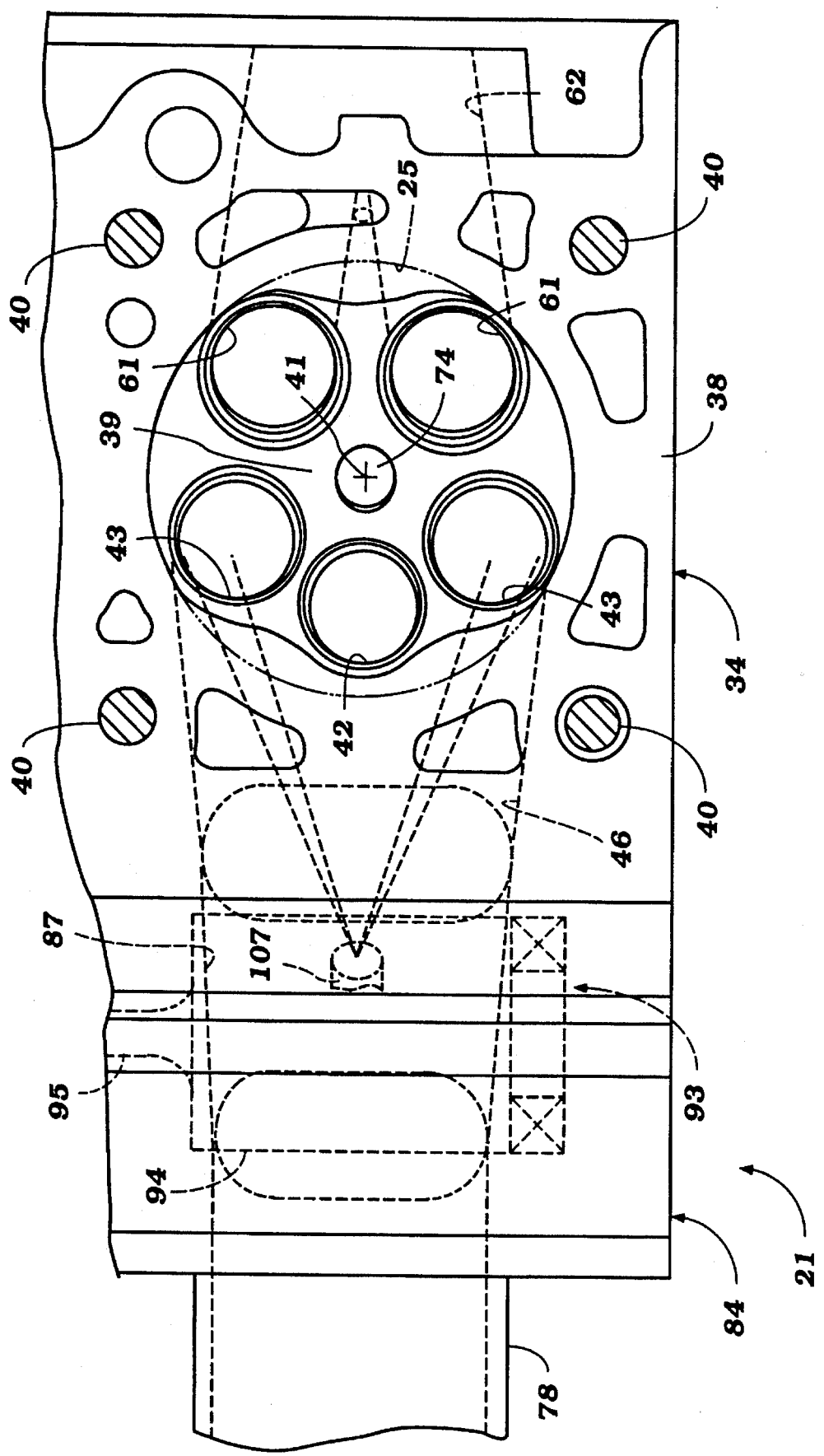
FIG. 4 is a bottom plan view of the cylinder head showing the combustion chamber configuration and, in phantom, the intake and exhaust passages.
Figure 5:
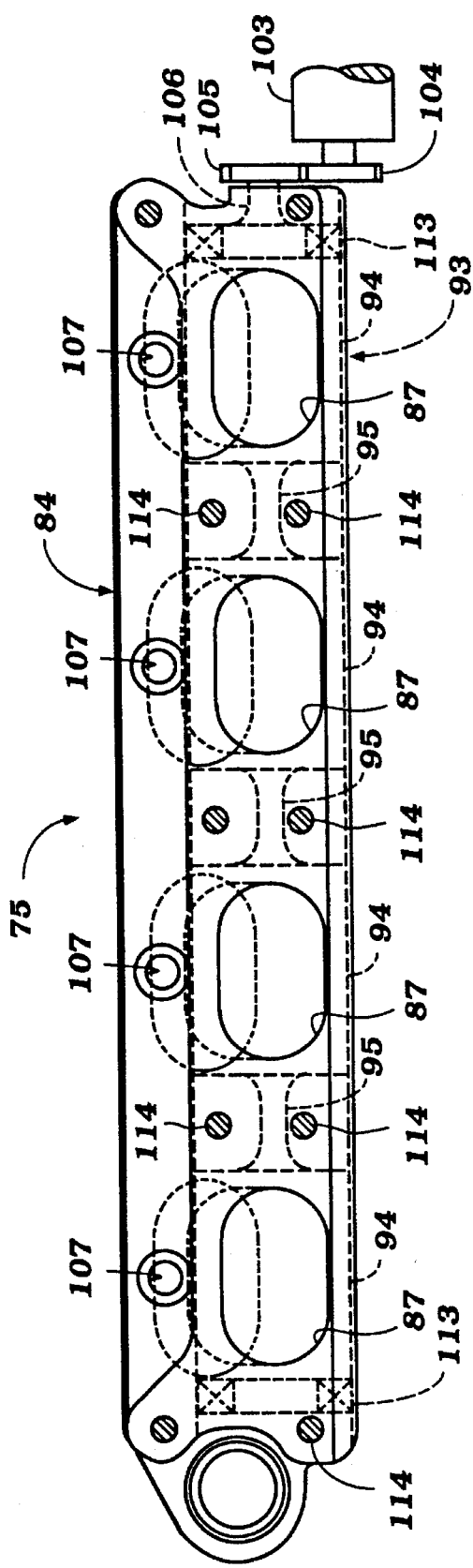
FIG. 5 is a side elevational view of the control valve assembly.

Continuing to refer to FIGS. 2–4, a pair of exhaust valve seats 61 are formed in the cylinder head recesses 39 on the side of the plane 41 opposite to the center intake valve seat 42. These exhaust valve seats 61 are formed at the beginning of exhaust passages 62, which extend through the exhaust side of the cylinder heads 34 and which terminate at the exhaust manifolds 38 previously referred to and illustrated in FIG. 1. The exhaust passages 62 may be of the Siamesed type, or if preferred, individual passages may be employed for each exhaust valve seat 61.

Exhaust valves 63 are slidably supported for reciprocation in the cylinder head 34 by valve guides 64 that are inserted into the cylinder head 34 in any suitable manner. The axes of reciprocation of the exhaust valves 63 lie in a common plane that is disposed at an angle $\theta_e$ to the plane containing the cylinder bore axis 41. The angle $\theta_e$ is equal to or greater than the angle $\theta_s$ of the side intake valves and substantially greater than the angle $\theta_c$ of the center intake valve.

Coil compression springs 65 encircle the stems of the exhaust valves 62 and act upon keeper retainer assemblies 66 for urging these valves to their closed position in seating engagement with the valve seats 61.

The exhaust valves 63 are opened by thimble tappets 67 that are slidably supported in bores 68 formed in the cylinder head 34. The bores 68 extend parallel to the axes of reciprocation defined by the valve guides 64 and extend downwardly from the upper cylinder head surface, as described in the aforenoted copending application, Ser. No. 08/363,412.

An exhaust cam shaft 69 is provided that has individual cam lobes 71 that engage each of the exhaust valve tappets 67 for operating them. The exhaust cam shaft 69 is journaled in the cylinder head 34 in the manner also described in copending application Ser. No. 08/363,412, which includes bearing caps 72.

As has been noted, the intake and exhaust cam shafts 57 and 69 are driven from the engine crankshaft 31 at one-half crankshaft speed. Any of a wide variety of types of cam shaft drives may be employed, including that described in copending application Ser. No. 08/363,412. As seen in FIG. 2, the intake camshaft 57 rotates about a rotational axis that is disposed at a lesser distance $L_1$ from the cylinder bore axis 41 than is the axis of rotation of the exhaust camshaft 69, this latter distance being indicated by the reference character $L_2$.

The area between the intake and exhaust camshafts 59 and 61 centered over each of the cylinder bores 25 is provided with a spark plug well that extends along an axis indicated at 73 and which is disposed at an acute angle $\theta_p$ relative to the plane containing the cylinder bore axis 41. A spark plug 74 is disposed at the lower end of this well for each cylinder bore 25 and extends into the cylinder head recess 39 for firing the charge which is introduced thereto through the induction system which will now be described.

The induction system 37 of this embodiment will now be described by primary reference to FIGS. 1–12. As has been noted, this induction system 37 is positioned in the valley 36 between the cylinder banks 23 and 24 and cooperates with the cylinder head surfaces 47 for supplying a fuel air charge to the induction passage 46 of the cylinder heads 34.

The induction system 37 is, except for the flow control valves, indicated generally by the reference numerals 75, the same as that disclosed in the copending application entitled "Intake Control System," Ser. No. 08/363,746, filed Dec. 23, 1994, in the names of Kenichi Sakurai, Masami Wada, and Masato Nishigaki (attorney docket no. YAMAH2.845A) and assigned to the assignee hereof the disclosure of which is incorporated herein by reference. Therefore, the portion of the induction system 37 which is the same as that described in the noted copending application Ser. No. 08/363,746, and be described only briefly.

This induction system includes a plenum chamber 76 that is disposed within the valley 36 between the cylinder banks 23 and 24, but which is spaced inwardly from it to provide a cooling air flow therearound. This plenum chamber 76 is provided with an atmospheric air inlet (not shown) in which a manually positioned throttle valve is contained for controlling the speed of the engine.

The plenum chamber 76 supplies air to an intake manifold, indicated generally by the reference numeral 77, and which has individual runner sections 78 which terminate in respective passages (to be described) of the control valve assembly 75 for delivering the air to the cylinder head intake passages 46.

In order to permit tuning of this induction system for a wide variety of engine speed and load ranges, each manifold runner 78 is served by a relatively short, high-speed intake passage 79 that communicates with the plenum chamber 76, and a second, relatively long primary intake passage 81. The passages 81 also terminate within the plenum chamber 76. The orientation and formation of these passages is described in more detail in the incorporated copending application.

The short, high-speed intake passages 79 all have sections that extend along the center of the engine and through which a throttle valve assembly 82 extends. The valve assembly 82 controls the opening and closing of these short, high-speed intake passages 79. The throttle valve assembly 82 is operated by any desired strategy, but primarily maintains the passages 79 closed at the low speed and low mid-range performance. Thus, the combustion chambers of the engine are served by the longer intake passages 81 which are tuned to provide optimum charging efficiency under their served running conditions. As the engine speed and load increases, the throttle valves 82 are opened automatically, and the effective length of the intake passages is shortened to provide better tuning and charging efficiency for high-speed running conditions.

The manifold runners 78 each have flanges 83 at their cylinder head ends which are affixed in a suitable manner to a valve body 84 of the control valve assembly 75. This valve body 84 is provided with a through-flow passage 86 which has an inlet end 87 that is complementary to the configuration of the runners 78 and which is generally oval in configuration, as may be best seen in FIG. 5. In a like manner, the passage 86 has a correspondingly shaped outlet that corresponds with an inlet opening 88 which is also of complementary shape and which forms the inlet to the individual cylinder head induction passages 46.

From the inlet opening 88, the cylinder head intake passages 44 divide into three generally cylindrically shaped portions comprised of a center portion 89 that serves the center intake valve seat 42 and a pair of side portions 91 which serve the side intake valve seats 43. In this particular embodiment, these portions 89 and 91 have very little dividing area between them and that is only immediately adjacent the respective valve seals 42 and 43.

Referring again to the control valve assembly 75, its main housing 84 is provided with a transversely extending bore 92 that extends through it, with the center of the bore 92 being disposed slightly inwardly of the intake passage 86 for a reason which will become apparent. A generally cylindrically shaped control valve element 93 has individual valving portions 94 which extend across each of the passages 86 associated with each of the cylinder head induction passages 46. Each of the valving portions 94 is separated from the others by means of a short, cylindrical portion 95 that extends between adjacent cylinders.

It should be noted that the valve body 84 is provided on the side opposite that to which the bore 92 is formed with a plurality of recesses 96 that have an elliptical, segmental shape, for a reason which will become readily apparent.

Figure 10:
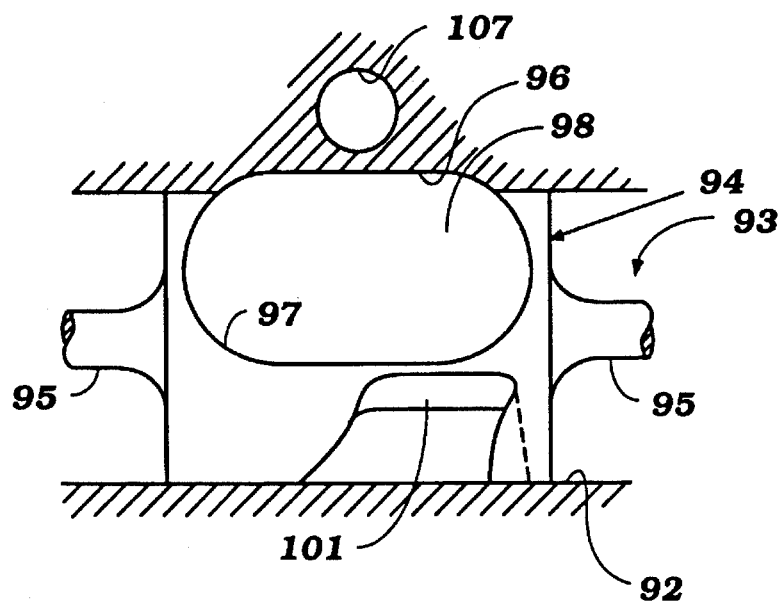
FIG. 10 is a view, in part similar to FIG. 9, and shows the control valve in its second position.
Figure 11:
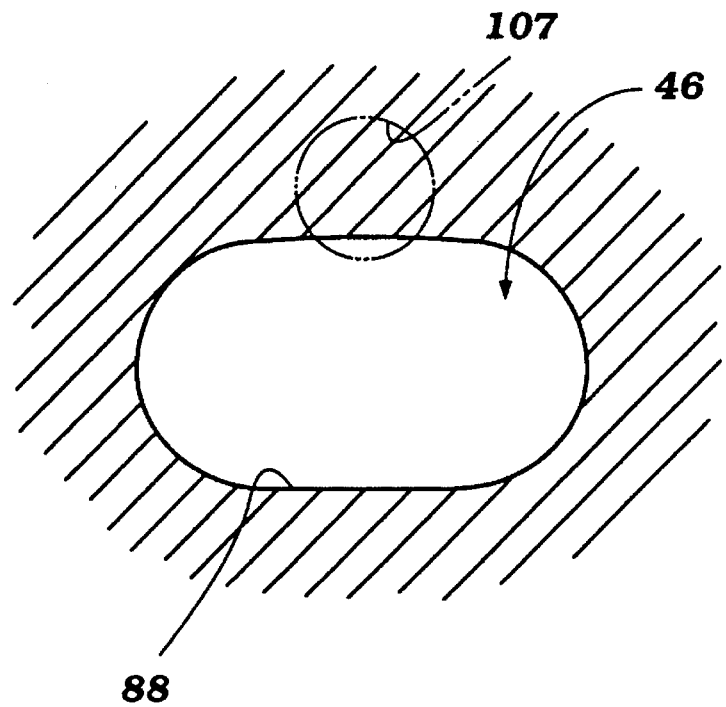
FIG. 11 is a cross-sectional view taken along the line 11—11 of FIG. 7.
Figure 12:
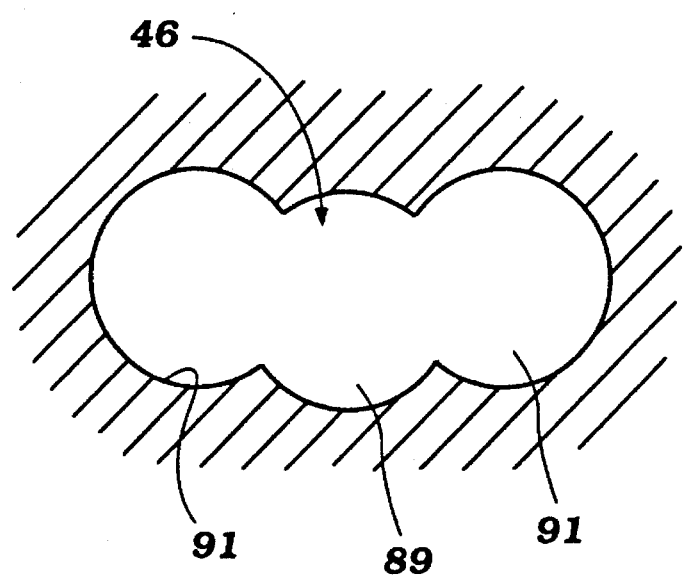
FIG. 12 is a cross-sectional view taken along the line 12—12 of FIG. 7.

Each valve element portion 94 is formed with a first cutout 97 which has a configuration as best shown in FIG. 10 that cooperates with the recess 96 so as to provide an unobstructed flow path 98 which has an elliptical shape complementary to the inlet opening 87 of the valve body 84 and to the inlet opening 88 of the cylinder head intake passage 46. Therefore, when the control valve element 93 is rotated to the position shown in FIGS. 3, 8, and 10, the flow from the intake manifold runner 78 to the valve seats 42 and 43 will be substantially unrestricted and unencumbered. Thus the charge enters the combustion chambers formed by the cylinder head recesses 39 in a generally unobstructed and free-flowing direction. This permits high volumetric efficiency and high engine outputs. However, and as has been noted, this configuration is such that the charge which enters the combustion chamber under low-speed, low-load conditions will be relatively unrestricted, and the flow direction will not cause any significant turbulence. This is undesirable for optimum low and mid-range performance.

Figure 7:
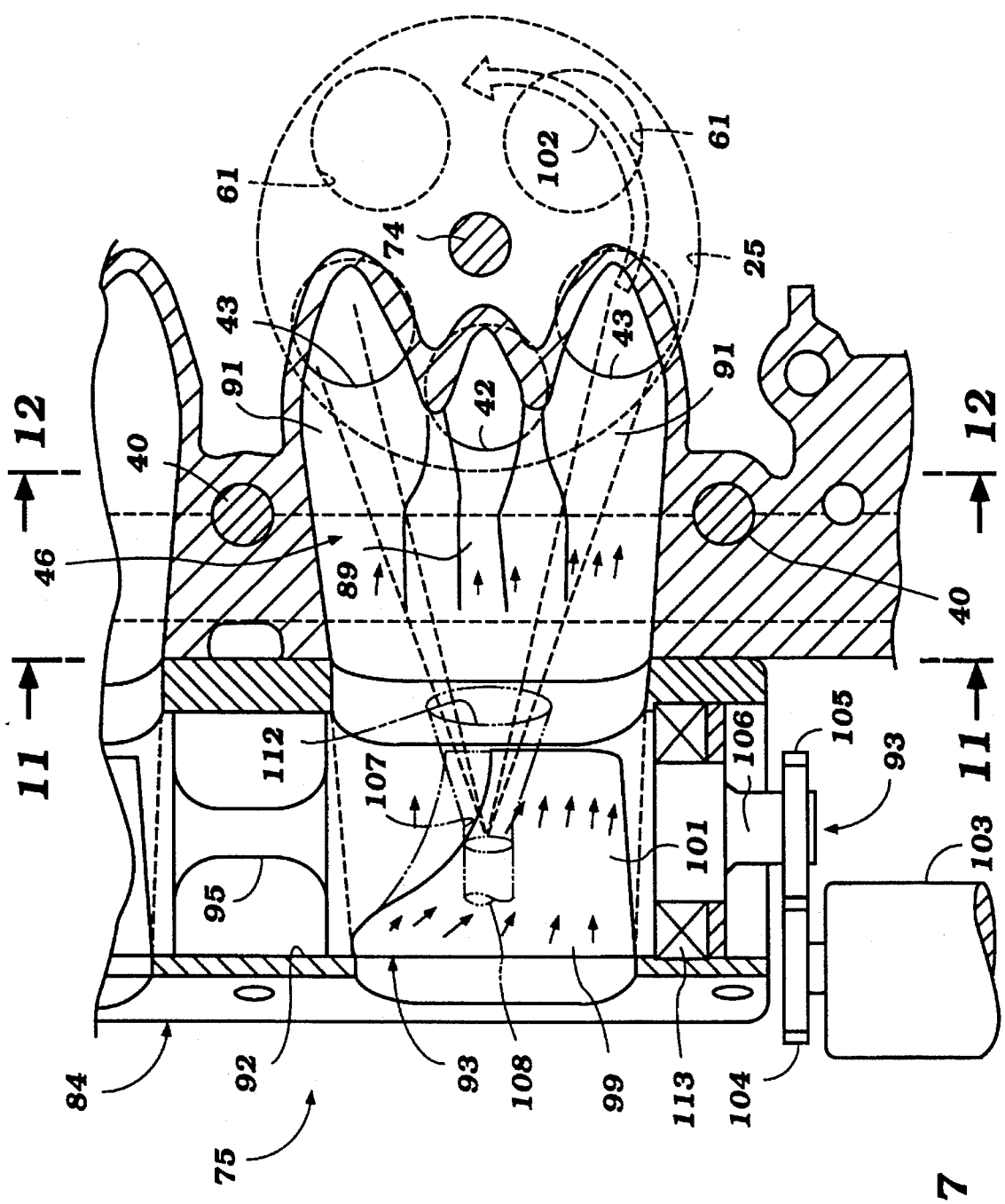
FIG. 7 is a cross-sectional view taken along the line 7—7 of FIG. 2 and shows the flow into the combustion chamber when the control valve is in the position as shown in FIG. 2.

Therefore, the control valve elements 94 are provided with a further flow-controlling recess 99 that has a generally large inlet portion that is generally complementary to the manifold runners 78 and valve body inlet portion 87, but which tapers and curves to a discharge end 101 which is disposed on one side of the valve body 94 and disposed so as to direct the air flow as shown in FIG. 7 when in its second extreme position primarily toward the center intake valve seat 42 and one side intake valve seat 43.

There will be some limited flow through a clearance area 102 also toward the other side intake valve seat 43. However, the resulting air flow into the cylinder is such as it will pass in the direction indicated by the arrow 102 in FIGS. 2 and 7 so as to generate both a swirl around the combustion chamber configuration and also a tumble action into the cylinders. This tumble action is caused because of the fact that the side intake passage 43 has the flow through it directed toward the side adjacent the plane containing the cylinder bore axis 41 so that there will be more flow on one side than the other, as shown in FIG. 2. In addition, the flow through the center intake valve seat 42 is also so directed, and this will further promote the tumble action. This gives rise to a high rate of turbulence in the combustion chamber, and also the restricted flow area increases the velocity. Thus, there will be good combustion and rapid flame propagation that will result in significantly improved performance.

The control valve 93 is operated by means of a servomotor 103 (FIG. 7) that is mounted at one end of the respective cylinder head 34 and on which a gear 104 is supported. The gear 104 is enmeshed with a gear 105 that is formed on a portion 106 of the control valve shaft 93 at this end of the engine so as to permit servo control of the control valve. The control may be as described in the aforenoted copending application, Ser. No. 08/363,746.

The control valve body 84 is provided with a plurality of fuel injector receiving ports 107 which are disposed in generally parallel relationship along the side of their flow passages 87. Fuel injectors 108 are mounted with their discharge nozzles in registry with these passages 107 by a mounting assembly 109. A fuel rail 111 supplies fuel to the fuel injectors 108.

Figure 8:
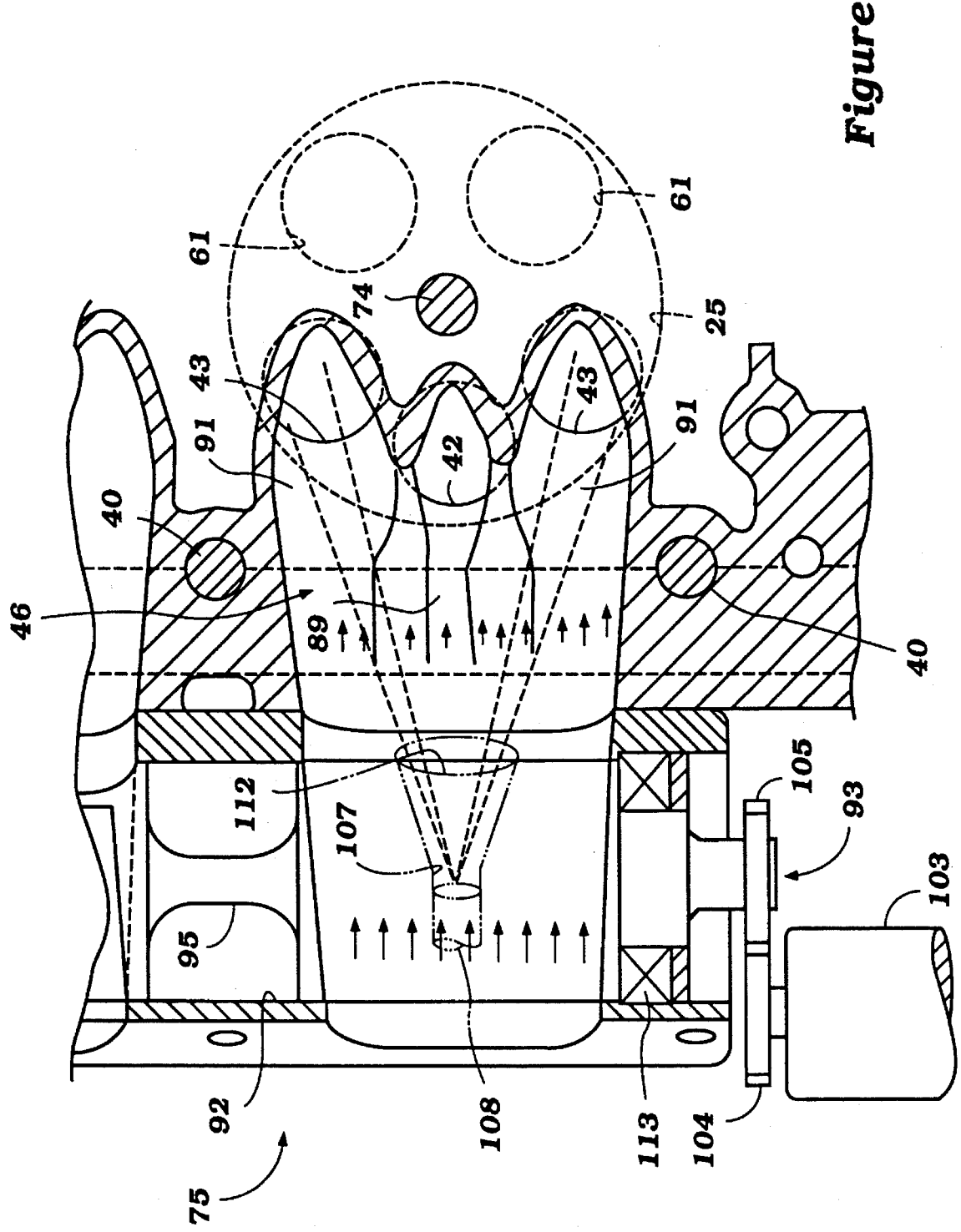
FIG. 8 is a view, in part similar to FIG. 7, and shows the flow when the control valve is in the position shown in FIG. 3.
Figure 9:
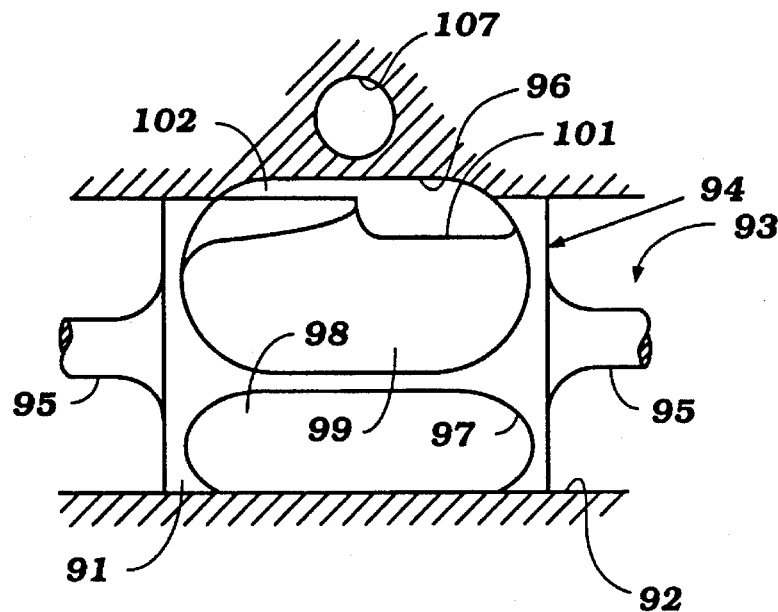
FIG. 9 is a view looking in the direction of the intake passage and shows the control valve in its first position.

In this embodiment, the passages 107 are generally flared outwardly so as to have relatively large outlet openings 112 so that the fuel sprayed therefrom will be directed to all of the intake valve seats 42 and 43 through their respective induction passage sections 89 and 91, as shown in FIGS. 7 and 8.

The ends of the control valve 93 are provided with cylindrical portions that are journalled in the valve body 84 by means of a pair of spaced-apart anti-friction bearings 113 and associated seals. The manifold runners 78 and valve body 84 are affixed to the cylinder head assemblies 54 by threaded fasteners 114 which pass either at the ends of the cylinder head or in the area of the reduced diameter interconnecting sections 95 of the control valve 93.

Figure 6:
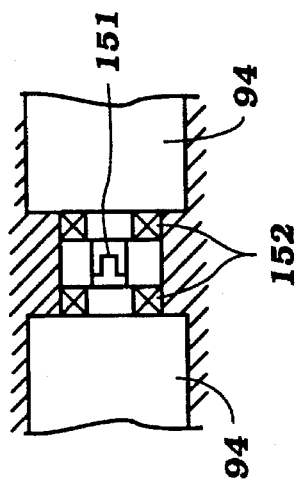
FIG. 6 is a partial view showing another type of arrangement for a control valve assembly.

FIG. 6 shows another embodiment of the invention wherein the individual valving segments 94, rather than being integrally connected to each other, are connected by means of a tongue and groove connection, indicated generally by the reference numeral 151. A pair of bearings 152 are disposed at opposite ends of this tongue and groove connection 151 and provide gas sealing and rotary support. This connection will permit some thermal expansion of the cylinder head 34 and valve body 84 relative to the control valve elements 94.

Figure 13:
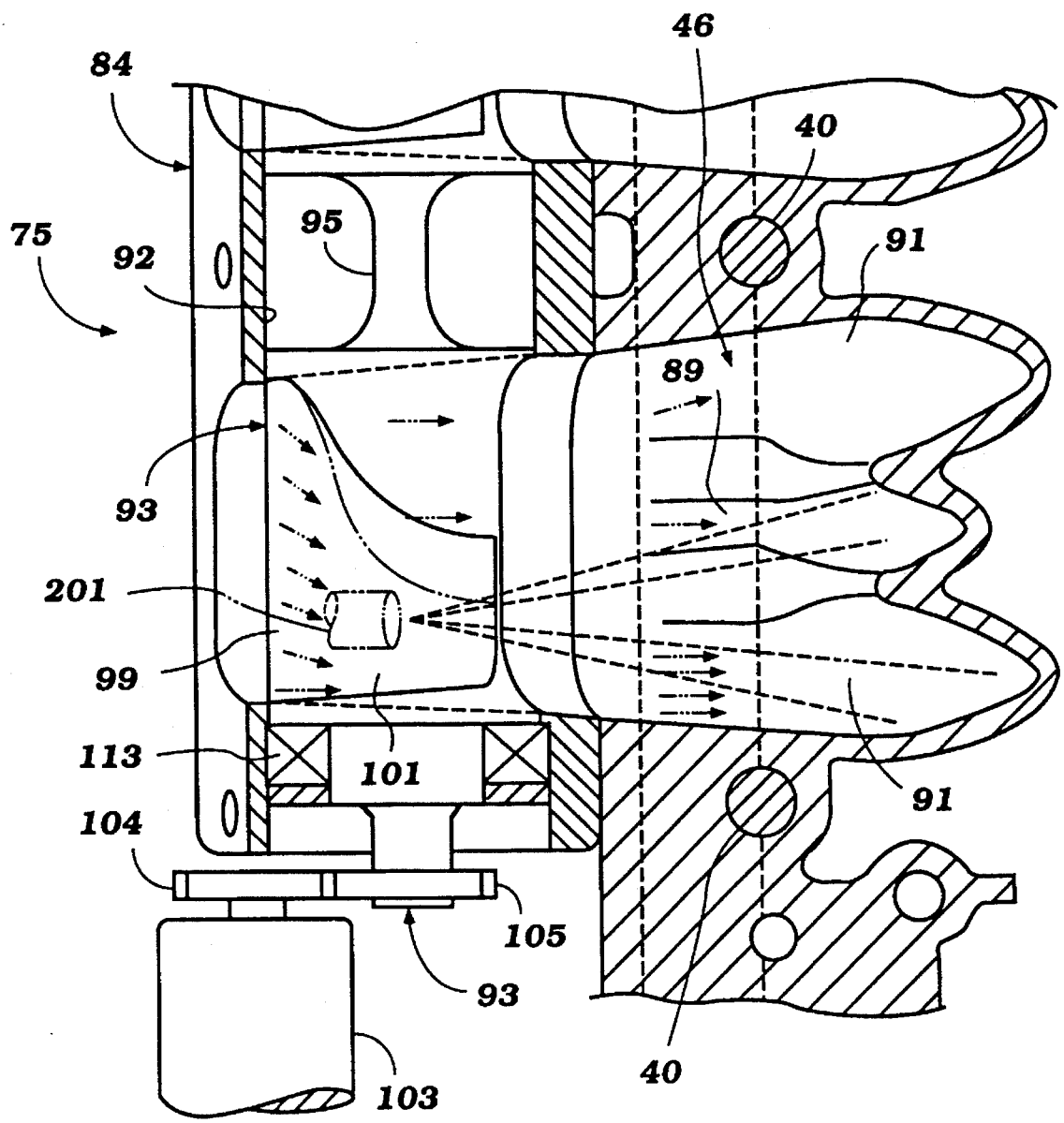
FIG. 13 is a view, in part similar to FIG. 7, and shows another embodiment of the invention, with the flow control valve in the corresponding position for this embodiment.
Figure 14:
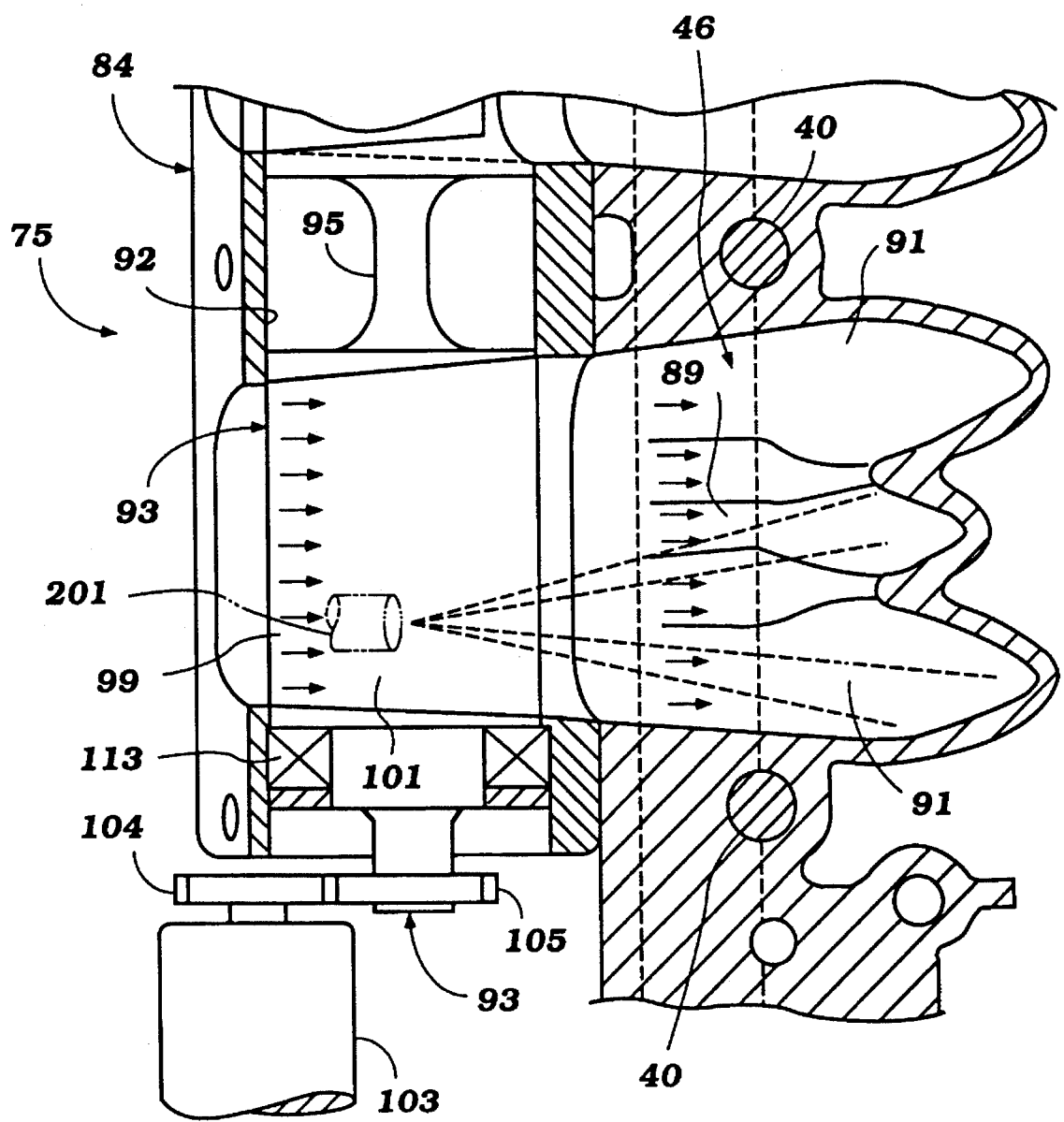
FIG. 14 is a view, in part similar to FIG. 8, and shows the control valve of the embodiment of FIG. 13 in the similar position.

FIGS. 13 and 14 show another embodiment of the invention which is generally the same as the embodiment of FIGS. 1–12. Because of this, only two figures, those corresponding to FIGS. 7 and 8, are believed necessary to understand the construction and operation of this embodiment. This embodiment differs from that previously described in that the fuel injector discharge recess, indicated by the reference numeral 201, is offset toward the side of the cylinder in which the air flow passes primarily when the control valve 93 is positioned in the low-speed turbulence-generating position. As a result, the fuel mixture will be delivered primarily to the one side intake valve seat 43 and the center intake valve seat 42, as shown in FIGS. 13 and 14, regardless of the position of the control valve 93. Even though the mixture strength is greater on one side of the cylinder when inducted, a homogeneous mixture will result under high-speed, high-load performance. Aside from this difference, this embodiment is the same and operates the same as that previously described, and for this reason, further description of the construction of this embodiment is not believed to be necessary to enable those skilled in the art to practice the invention.

Figure 15:
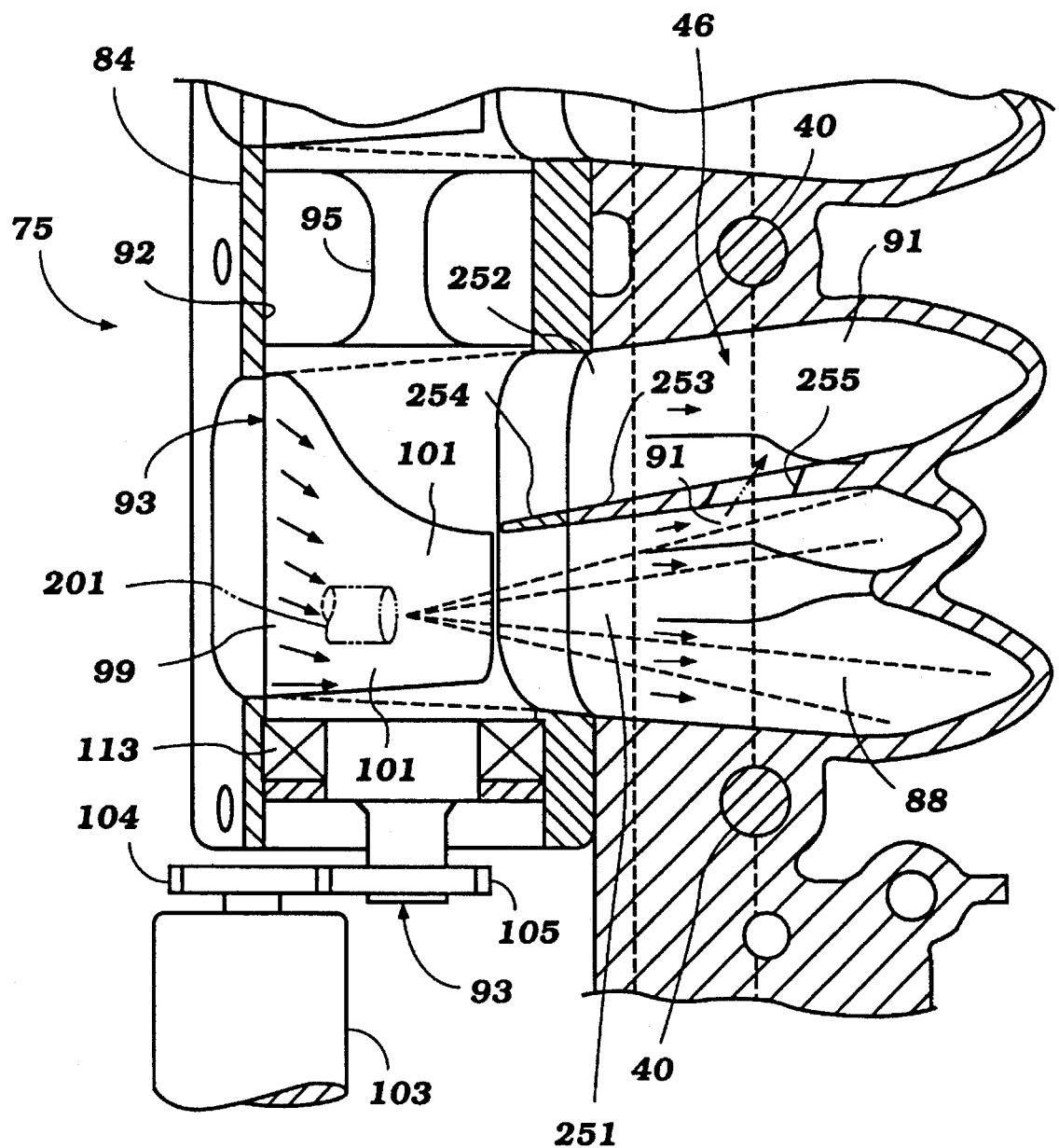
FIG. 15 is a cross-sectional view, in part similar to FIGS. 7 and 13, and shows a still further embodiment of the invention.
Figure 16:
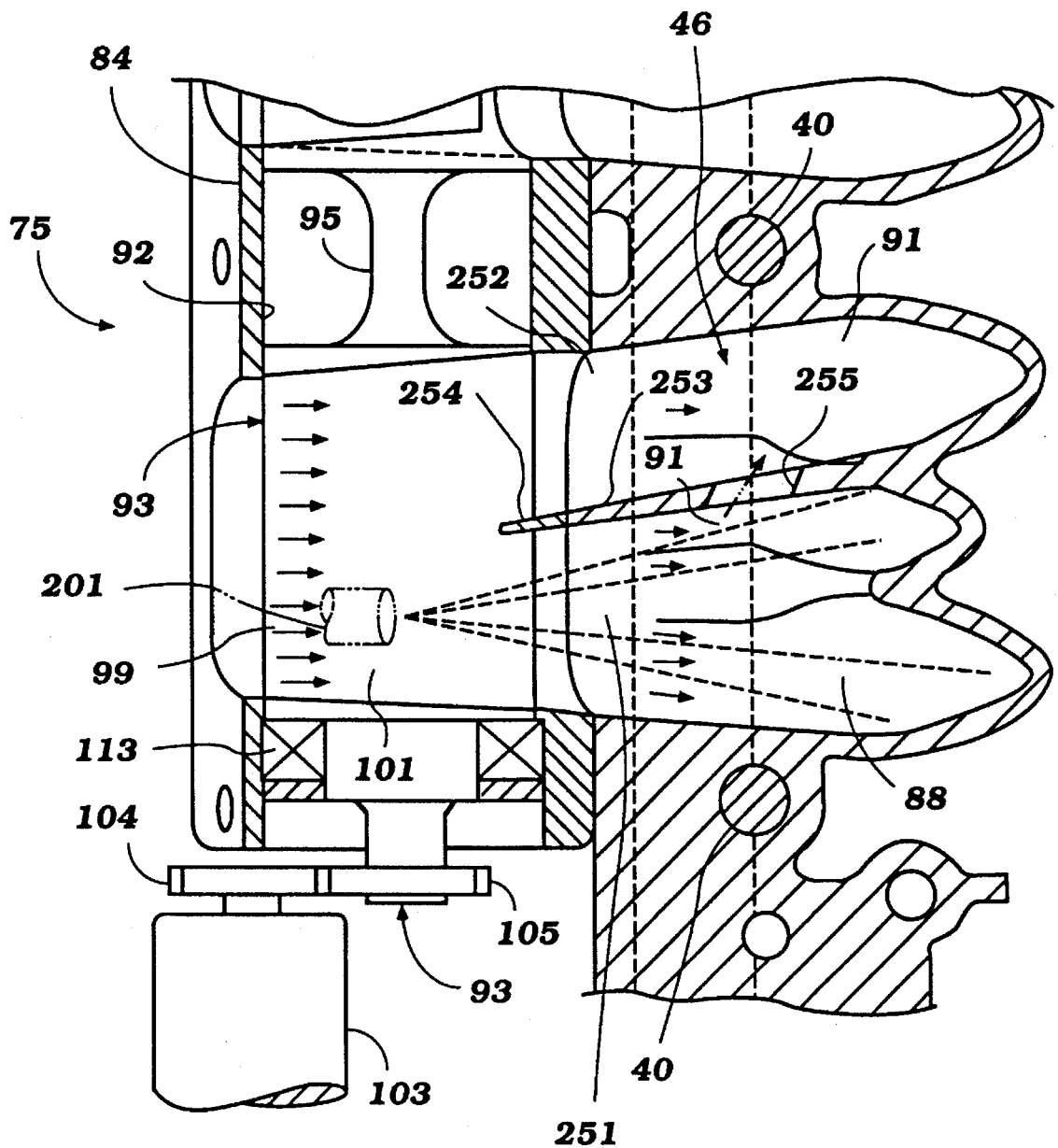
FIG. 16 is a cross-sectional view of this embodiment showing the control valve in its second position.

In all of the embodiments as thus far described, the intake passage 46 of the cylinder head has been substantially open up until the area immediately adjacent the valve seats 42 and 43. FIGS. 15 and 16 show another embodiment of the invention wherein the passages to which the flow is directed when the control valve 93 is in its low-speed, low-load condition are somewhat isolated from the remaining passage. In this embodiment, it should be noted that the cylinder head intake passage 46 is divided into a first portion 251 and a second portion 252 by an integral wall 253 of the cylinder head 34. The wall 253 has a further portion 254 that extends into and is formed by the control valve body 84 and which is disposed so as to be aligned with one side of the restricted portion 101 of the control valve 93 when in its low-speed, low-load condition.

Thus, the primary portion of the air charge will be delivered to the center intake valve seat and the side intake valve seat through the passages 88 and 91. However, some flow is also permitted to the remaining side intake valve passage 91 through a flow-directing opening 255 that is formed in the wall 253 and which is inclined from its inlet end to its outlet end toward the remaining side intake passage 91, as seen best in FIGS. 15 and 16. This arrangement employs the offset positioning of the fuel injector opening 201 as with the embodiments of FIGS. 13 and 14. It is to be understood, however, that a central fuel injector placement as with the embodiment of FIGS. 1–12 could also be employed in conjunction with this embodiment.

In the embodiments as thus far described, the control valve assembly 75 has the function when in its closed low-speed, low-load condition so as to restrict the flow through one of the side intake valve seats. As has been noted, this promotes both tumble and swirl. FIGS. 17–20 show another embodiment of the invention which employs a cylinder head porting configuration as shown in FIGS. 1–12, but which employs a control valve that has its valving portions 301 configured so as to primarily restrict the flow to the center intake valve seat 42 under these low-speed, low-load conditions and promote a greater flow through the side intake valve seats 43 and redirect this flow. This action will increase the amount of tumble that is generated and reduce or eliminate the amount of swirl from that of the previously described embodiments. Since the only difference between this embodiment and that of FIGS. 1–12 is in the configuration of the valve control elements 301, all other components have been identified by the same reference numerals and will not be described again, except insofar as is necessary to understand the construction and operation of this embodiment.

Figure 18:
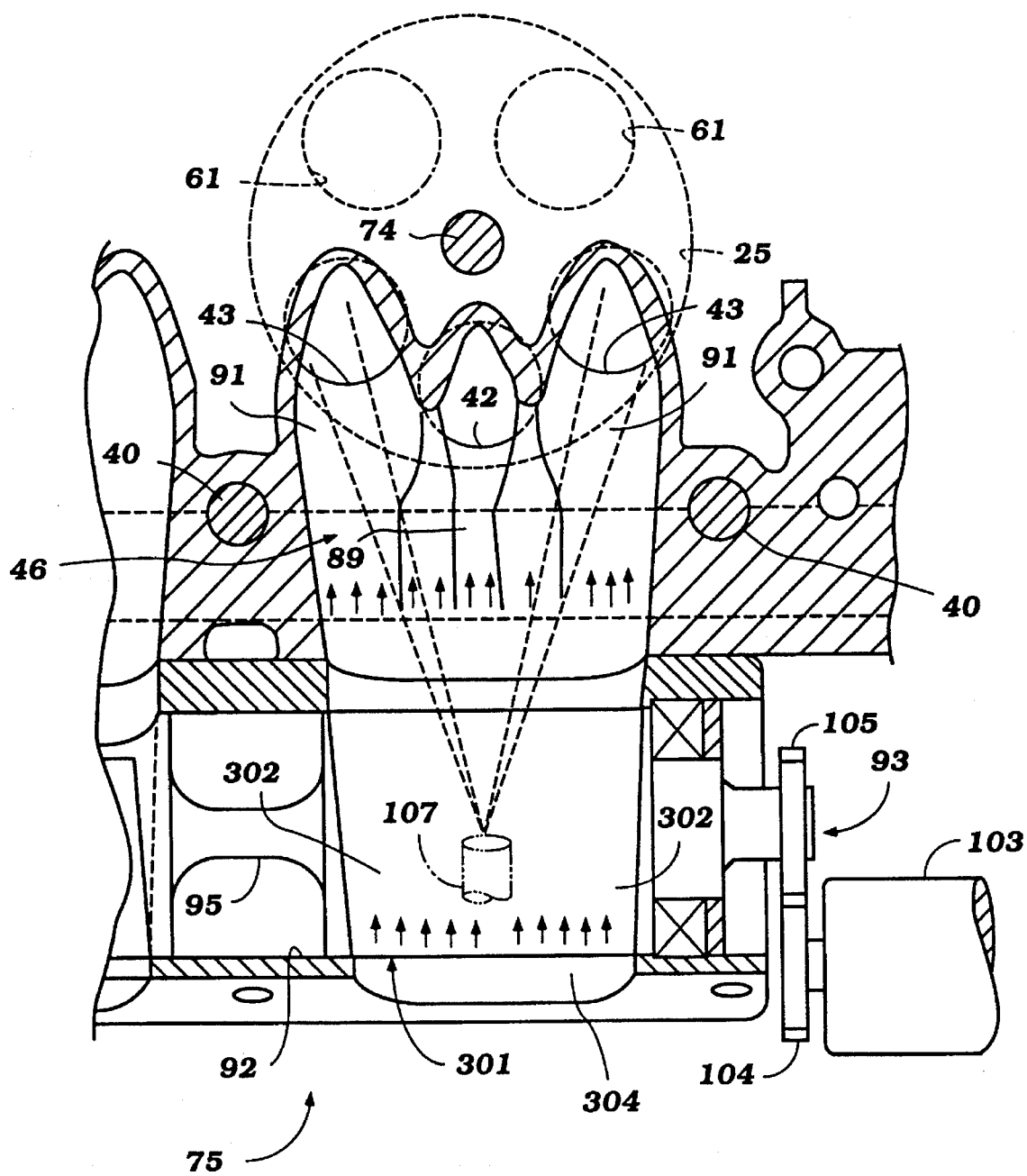
FIG. 18 is a cross-sectional view, in part similar to FIGS. 8, 14, and 16, showing the control valve of this embodiment in the corresponding second position.
Figure 20:
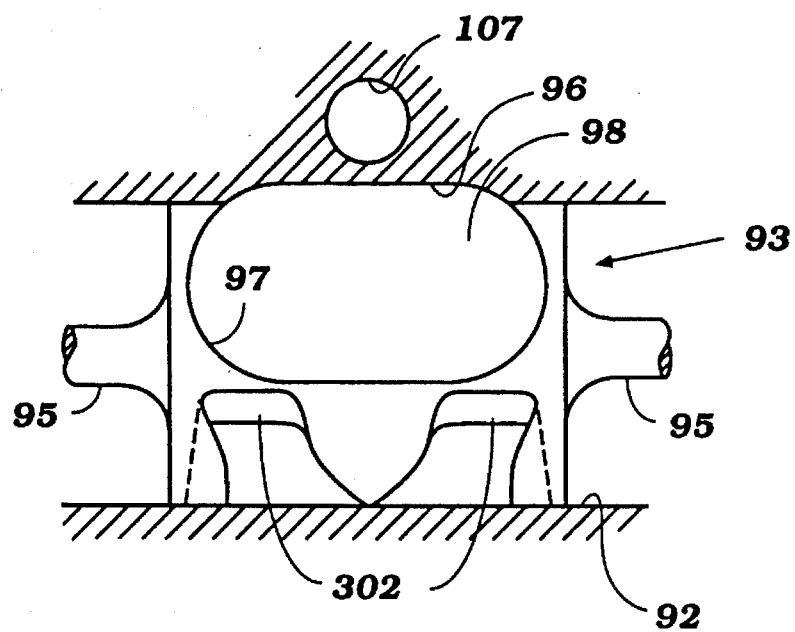
FIG. 20 is a cross-sectional view, in part similar to FIG. 19, and shows this control valve element in its second position.

In this embodiment, the valve elements 301 have a generally cylindrical configuration and have a first cutout 97 which cooperates with the valve body recess 96 so as to provide an unobstructed flow passage 98 when the valve is in the position shown in FIGS. 18 and 20. In this regard, this embodiment is also the same as that previously described, and hence the same reference numerals have been applied.

Figure 17:
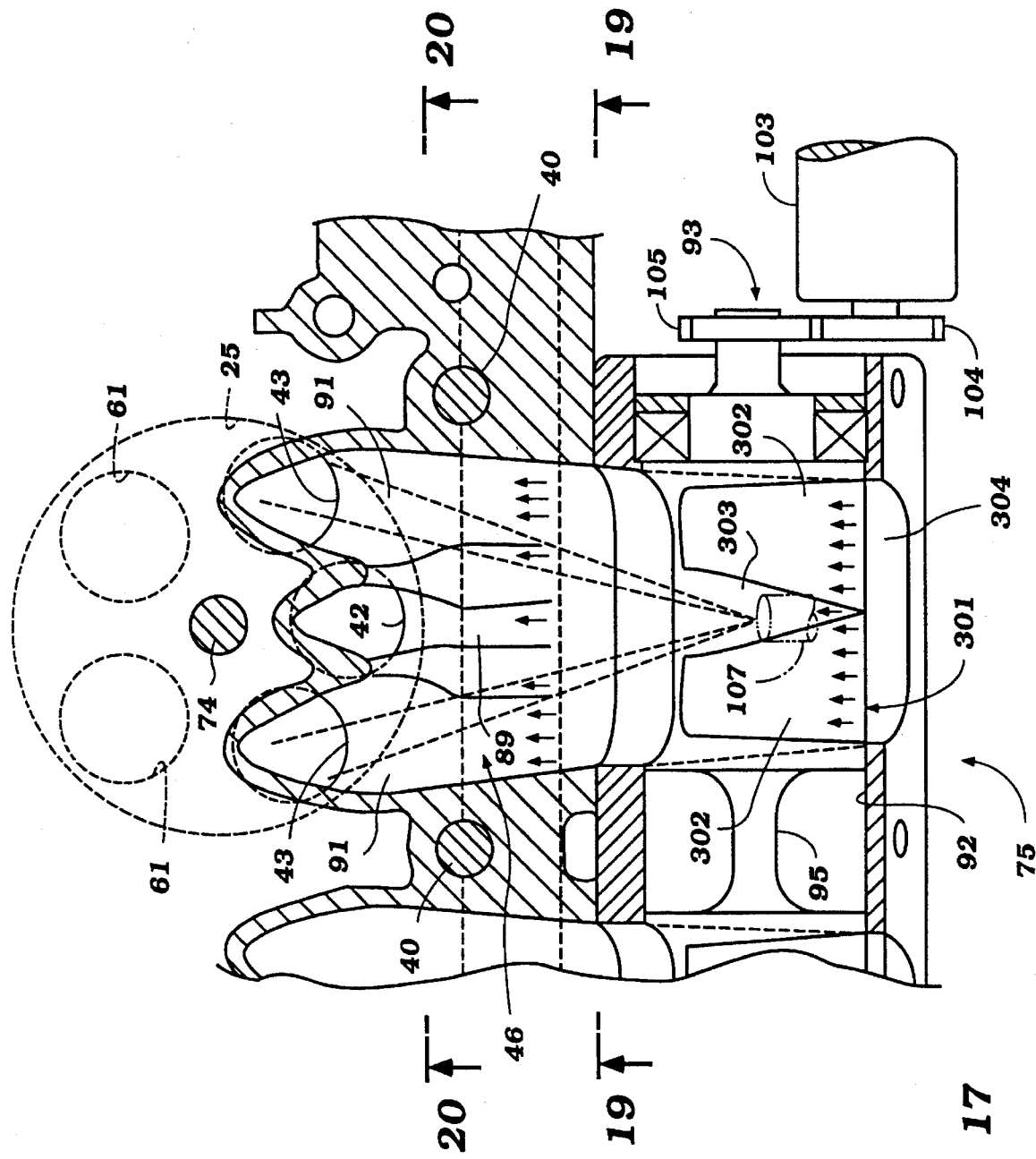
FIG. 17 is a cross-sectional view, in part similar to FIGS. 7, 13, and 15, and shows another control valve embodiment in the same first position.
Figure 19:
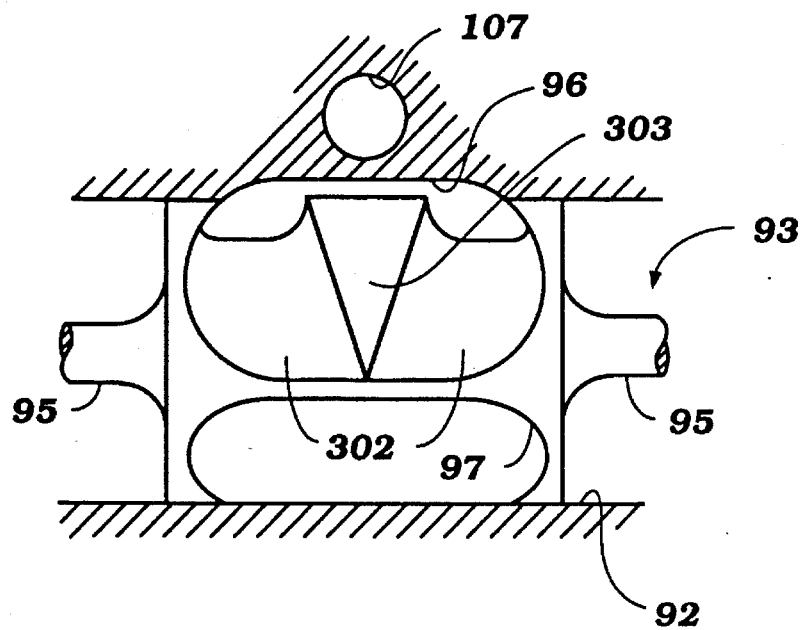
FIG. 19 is a view, in part similar to FIG. 9, but shows the control valve of the embodiment of FIGS. 16–18.

In this embodiment, however, the shape of the valve element 301 in its other position is defined by a pair of flow-directing portions 302, which are divided by a wall 303 and which extend from a common inlet opening 304 which registers with the manifold runners 78 when in the position shown in FIGS. 17 and 19. The upstanding wall 303 will, however, in this position substantially obstruct any flow through the cylinder head passage portion 89 to the center intake valve seat 42 and direct substantially all of the flow to the side intake valve seat portions 91. Thus, substantially all of the flow will pass to the cylinder through the side intake valve seats 43. As with the previously described embodiment, this configuration is also such that the flow will be directed primarily toward the sides of the valve seats 43 closest to the cylinder bore axis 41, and hence primarily a tumble action will be generated. This tumble action will be accompanied by little swirl in this embodiment, since the flow is generally symmetric into the combustion chamber.

Figure 21:
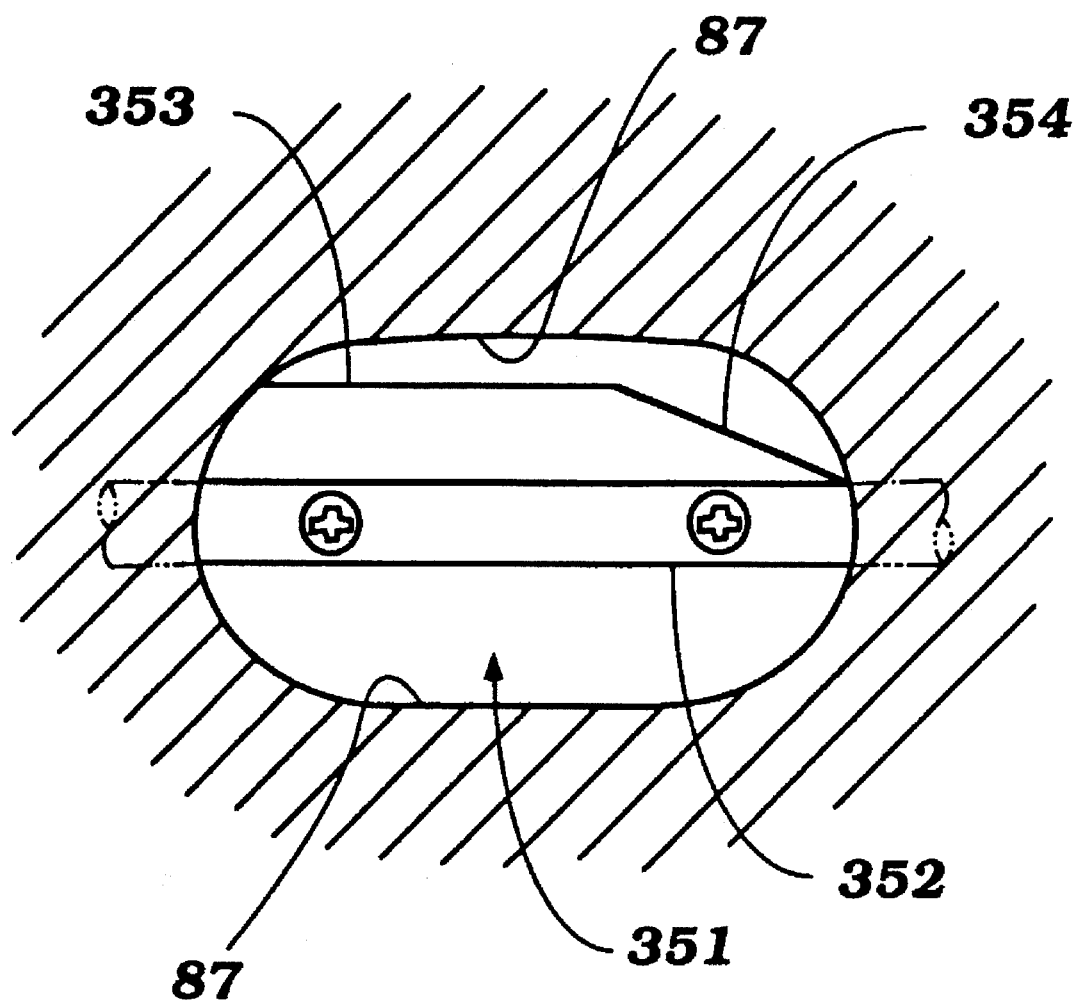
FIG. 21 is a cross-sectional view, in part similar to FIGS. 9 and 19, and shows plate-type control valve element.

In all of the embodiments as thus far described, the control valve has embodied a cylindrical valve element having a configured outer surface. FIG. 21 shows an embodiment wherein the valve element is of the plate type, and the valve element is indicated in this figure by the reference numeral 351. There is provided a valve element 351 for each control valve body passage 87, and these are all affixed on a common control valve shaft 352 that is driven in the manner previously described. The control valve element 351 is of the butterfly type and has along one edge a cutout 353 that terminates adjacent one of the side intake valve seats 42 in a tapered portion 354. As a result, the flow will be directed into the cylinder similar to that of the embodiment of FIGS. 1–12 when the valve element 351 is in its closed position. Hence, a swirl and tumble will be generated. When the valve element 351 is opened, however, there will be no flow resistance, and the normal flow will result.

From the foregoing description it should be readily apparent to those skilled in the art that the invention is particularly adapted in providing a three-intake-valve-per-cylinder arrangement that ensures good and full flow to the combustion chambers without restriction and without turbulence under high-speed, high-load conditions. However, the embodiments are effective in not only increasing the velocity, but also redirecting the flow pattern under low-speed, low-load conditions so as to generate the type of motion and turbulence in the combustion chamber, be it either swirl and tumble or tumble alone. Of course, the foregoing description is that of preferred embodiments of the invention, and various changes and modifications may be made without departing from the spirit and scope of the invention as defined by the appended claims.

I claim:

1. An induction system for an internal combustion engine having a combustion chamber served by at least three intake valve seats, an intake passage arrangement comprised of at least a common section serving each of said intake valve seats, a control valve supported in said common section for controlling the flow therethrough and movable between a first position wherein the flow through each of said valve seats is substantially unrestricted and without significantly affecting the flow direction issuing from said intake valve seats into said combustion chamber and a second position wherein the flow through one of said valve seats is substantially restricted and the flow through another one of the valve seats is directed into the combustion chamber in a different direction than when said control valve is in its first position.

2. An induction system as in claim 1, wherein the flow through the other valve seat when the control valve is in its second position is directed more to one side of the valve seat than the other side of the valve seat.

3. An induction system as in claim 2, wherein the directed flow in the second position of the control valve effects tumble in the combustion chamber.

4. An induction system as in claim 3, wherein the redirected flow when the control Valve is in its second position also effects swirl in the combustion chamber by causing more flow along one side of the axis of the combustion chamber than along the other side of the combustion chamber axis.

5. An induction system as in claim 4, further including a fuel injector for spraying fuel into the intake passage arrangement.

6. An induction system as in claim 5, wherein the fuel injector sprays fuel into the intake passage arrangement downstream of the control valve.

7. An induction system as in claim 6, wherein the fuel injector sprays the fuel into the common section of the intake passage arrangement.

8. An induction system as in claim 7, wherein the fuel injector sprays fuel in a direction extending generally along the axis of the combustion chamber.

9. An induction system as in claim 7, wherein the fuel injector sprays fuel toward one side of the combustion chamber axis.

10. An induction system as in claim 1, wherein the control valve comprises a cylindrical valve element.

11. An induction system as in claim 10, wherein the cylindrical valve element has a first cut-out portion adapted to define the unrestricted flow portion when in its first position and a second configured portion adapted to define the restricted flow redirecting passage when in its second position.

12. An induction system as in claim 1, wherein the control valve comprises a plate-type valve element.

13. An induction system as in claim 1, wherein there are provided a pair of side intake valve seats disposed closer to a plane containing the axis of the combustion chamber and a center valve seat disposed between the side intake valve seats and further from the plane.

14. An induction system as in claim 13, wherein the flow through one of the side valve seats is substantially restricted when the control valve is in its first position.

15. An induction system as in claim 13, wherein the flow through the center intake valve seat is substantially restricted when the control valve is in its first position.

16. An induction system as in claim 13, wherein the control valve redirects the flow to the combustion chamber through at least one of the side intake valve seats when in its second position.

17. An induction system as in claim 16, wherein the control valve redirects the flow to both of the side valve seats when in its second position.

18. An induction system as in claim 17, wherein the control valve substantially restricts the flow to the center valve seat when in its second position.

19. An induction system as in claim 16, wherein the control valve redirects the flow through the center valve seat when in its second position.

20. An induction system as in claim 19, wherein the control valve substantially restricts the flow to the other side valve seat when in its second position.

21. An induction system as in claim 1, wherein the intake passage arrangement provides a substantially common flow passage up to each of the valve seats.

22. An induction system as in claim 1, wherein there is a wall formed in the engine in the portion of the intake passage arrangement downstream of the control valve for separating the flow to one of the valve seats from the flow to the remaining valve seats.

23. An induction system as in claim 21, further including a communication hole formed in the wall.

24. An induction system as in claim 1, wherein the intake passage arrangement is formed at least in part in a cylinder head of the engine and wherein the control valve forms a portion of a control valve body affixed to the cylinder head.

25. An induction system as in claim 24, further including an intake manifold affixed to said control valve body and supplying an air charge thereto.

26. An induction system as in claim 25, wherein the intake manifold provides two different length effective passages for serving the control valve body.

27. An induction system as in claim 26, further including a further valve for controlling the effective length of the intake passage serving the control valve body.

28. An induction system as in claim 25, wherein the control valve comprises a separate body disposed between the intake manifold and the cylinder head.

29. An induction system as in claim 28, wherein there are a plurality of cylinders each having three intake ports and wherein the control valve body has a separate common passage for each combustion chamber and a separate valve element portion for controlling the flow through a respective one of said separate passage.

30. An induction system as in claim 29, further including means providing a connection between said valve element portions for permitting thermal expansion while maintaining the angular relationship between the control valve element portions.

* * * * *